(12) United States Patent
Hall et al.

(10) Patent No.: US 9,988,118 B1
(45) Date of Patent: Jun. 5, 2018

(54) LOAD-LEVELING SUSPENDED HANGER

(71) Applicants: David R. Hall, Provo, UT (US);
Jerome Miles, Spanish Fork, UT (US);
Casey Webb, Spanish Fork, UT (US);
Clint Gibson, Provo, UT (US); Daniel Madsen, Vineyard, UT (US); Matthew Van Dyke, Mapleton, UT (US); Joe Fox, Spanish Fork, UT (US)

(72) Inventors: David R. Hall, Provo, UT (US);
Jerome Miles, Spanish Fork, UT (US);
Casey Webb, Spanish Fork, UT (US);
Clint Gibson, Provo, UT (US); Daniel Madsen, Vineyard, UT (US); Matthew Van Dyke, Mapleton, UT (US); Joe Fox, Spanish Fork, UT (US)

( * ) Notice: Subject to any disclaimer, the term of this patent is extended or adjusted under 35 U.S.C. 154(b) by 0 days. days.

(21) Appl. No.: 15/587,937

(22) Filed: May 5, 2017

(51) Int. Cl.
| | |
|---|---|
| *B62H 3/12* | (2006.01) |
| *A47B 81/00* | (2006.01) |
| *F16B 45/00* | (2006.01) |
| *F16B 1/00* | (2006.01) |
| *F16B 47/00* | (2006.01) |

(52) U.S. Cl.
CPC ............. *B62H 3/12* (2013.01); *A47B 81/00* (2013.01); *F16B 1/00* (2013.01); *F16B 45/00* (2013.01); *F16B 47/003* (2013.01); *F16B 2001/0028* (2013.01); *F16B 2001/0035* (2013.01)

(58) Field of Classification Search
CPC .......... B62H 3/12; F16B 47/003; F16B 45/00; F16B 1/00; F16B 2001/0035; F16B 2001/0028; A47B 81/00
See application file for complete search history.

(56) References Cited

U.S. PATENT DOCUMENTS

| | | | | |
|---|---|---|---|---|
| 2,905,806 | A * | 9/1959 | Tunney | B66C 7/04 104/98 |
| 3,593,428 | A * | 7/1971 | Jacoff | G01C 9/34 33/379 |
| 5,979,600 | A * | 11/1999 | Bitner | E04G 3/26 182/45 |
| 6,312,140 | B1 * | 11/2001 | McGuire | F21L 14/02 362/249.07 |
| 6,564,526 | B2 * | 5/2003 | Chambers | E04L 32/702 52/233 |
| 9,316,371 | B2 * | 4/2016 | Kim | F21S 2/00 |
| 9,697,754 | B2 * | 7/2017 | White | G09F 7/18 |
| 2012/0068133 | A1 * | 3/2012 | Ozarski | B62H 3/12 254/364 |
| 2016/0178171 | A1 * | 6/2016 | Reid | F21S 2/00 362/249.11 |

\* cited by examiner

*Primary Examiner* — Ko H Chan

(57) ABSTRACT

The invention is a suspended hanger with an adjustable slide that helps to maintain the suspended hanger in a balanced condition. The hanger has a tubular channel with a longitudinal slot. The channel has one or more devices for attaching suspended objects to the channel. Affixed to the channel by means of the slot is a slide that has a frictional breaking mechanism. The braking mechanism uses a lever and compression spring to secure the slide to any position along the channel. When objects are suspended from or removed from the hanger, the slide is adjusted to achieve the balanced condition. The suspended hanger may be suspended overhead by one or more pulleys. The invention is especially suited for holding bicycles, especially three bicycles.

18 Claims, 11 Drawing Sheets

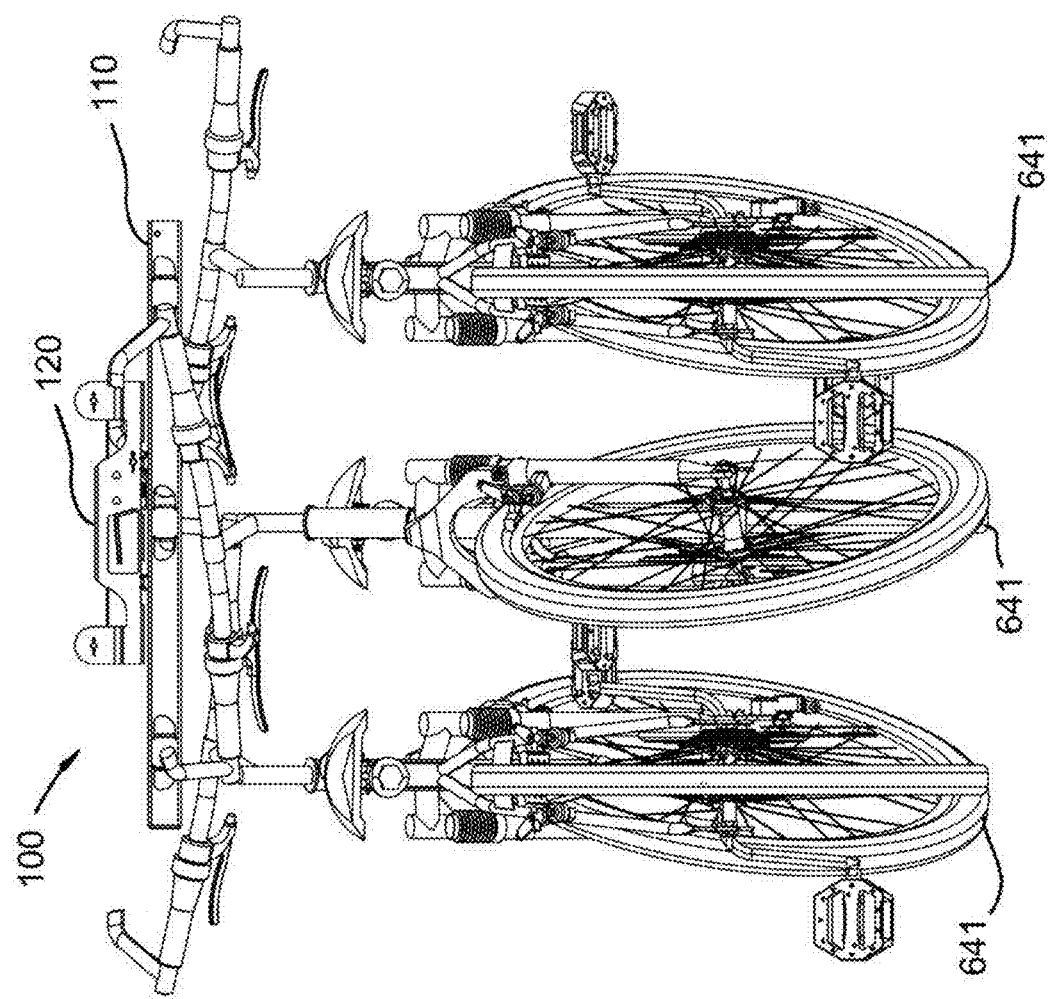

LOAD-LEVELING SUSPENDED HANGER

TECHNICAL FIELD

This invention relates generally to the field of storage equipment, and more specifically to overhead storage.

BACKGROUND

Many consumers today use their residential garages to store items that do not easily fit inside of a house. Such items include sporting equipment such as bicycles, kayaks, canoes, and rafts. These items are large and difficult to store effectively. Too many of these items can accumulate to the point where a car or truck cannot fit inside of the garage. Overhead storage systems are frequently used to solve this problem, taking advantage of ceiling space in a garage for storage. Such systems use a hoist to raise items to a sufficient height so the items do not interfere with people and vehicles on the ground level of the garage. The items remain at this elevated height until needed.

Many different racks and hangers have been developed to attach various items to a hoist in order to be lifted and stored as previously described. Many such racks have been developed specifically to store bicycles. Bicycle racks that accommodate a single bicycle are well known in the art. Bicycle racks that accommodate more than one bicycle present additional challenges. One such challenge is that a person may attach any number of bicycles to the rack which affects the balance of the rack. For example, a bicycle rack may be designed to accommodate four bicycles. In such a case, a person may attach one, two, three, or four bicycles to the rack, and each configuration has different requirements to keep the rack in balance.

Several methods have been developed to address these problems. One bike rack maintains balance with a varying number of attached bicycles by including a second hoist. The first and second hoists are attached to opposite ends of the bike rack and the rack remains in balance with the varying loads. Other inventions incorporate a similar solution without needing the additional hoist by attaching one hoist to at least two points on the bike rack like before. Using one hoist instead of two decreases the cost of the system, but the second attachment point on the rack requires a corresponding attachment point on the ceiling of the garage, which takes up more space.

In light of the foregoing, what is needed is a bicycle rack that is liftable by a single hoist that does not require attachment points at both ends of the rack that is able to accommodate various numbers of bicycles while maintaining balance.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow for a load-leveling suspended hanger.

Consistent with the foregoing, a load-leveling suspended hanger is disclosed. The suspended hanger comprises a tubular channel comprising a longitudinal slot and one or more means for removably attaching one or more suspended objects to the tubular channel. The suspended hanger further comprises a slide that engages the longitudinal slot. The slide comprises a frictional braking mechanism comprising a lever and a compression spring. The lever comprises a foot, wherein the compression spring causes the foot to tribologically engage the tubular channel, fixing the slide to a position along the tubular channel. The position of the slide is adjusted to maintain a balanced condition of the suspended hanger when asymmetrically loaded.

In some embodiments, the slide engages the longitudinal slot by means of one or more tabs, some comprising grooves. In some embodiments, the tubular channel comprises hooks as means for removably attaching one or more suspended objects. In other embodiments, the slide comprises pulleys or eyebolts by which the suspended hanger is suspended. In some embodiments, the tubular channel comprises end stops to keep the slide engaged with the longitudinal slot and end caps to cover sharp edges of the tubular channel. In other embodiments, the lever comprises a handle and is manually actuatable by a user. In some embodiments, the suspended objects comprise bicycles and the suspended hanger is designed to hold three bicycles.

BRIEF DESCRIPTION OF THE DRAWINGS

A more particular description of the invention briefly described above is made below by reference to specific embodiments depicted in drawings included with this application, in which:

FIG. 6A-FIG. 6B depict embodiments of a suspended hanger supporting bicycles.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
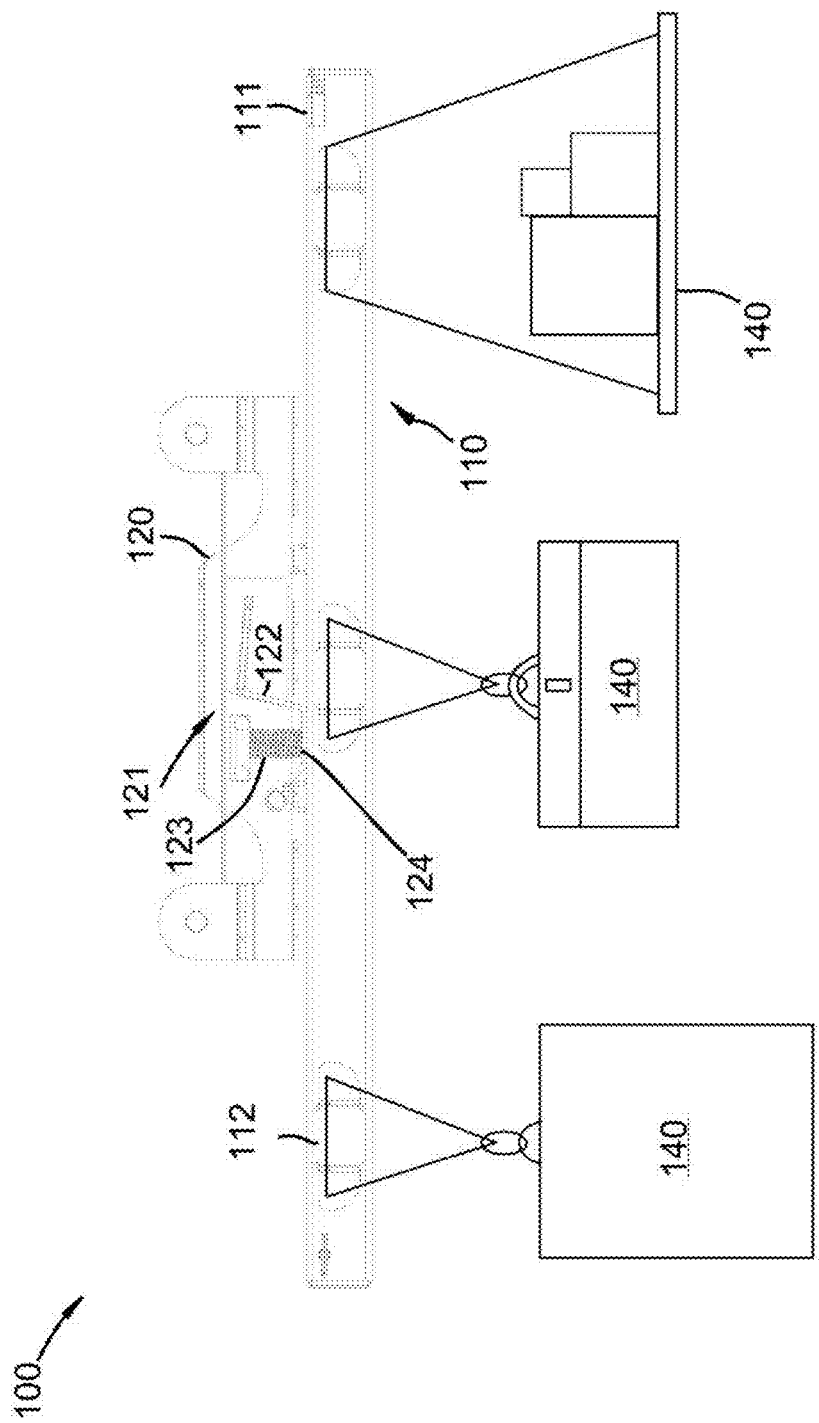
FIG. 1 depicts one embodiment of a suspended hanger comprising a tubular channel and a slide.

FIG. 1 depicts one embodiment of a suspended hanger 100 comprising a tubular channel 110 and a slide 120. The tubular channel 110 comprises a longitudinal slot 111 and one or more means 112 for removably attaching one or more suspended objects 140 to the tubular channel 110. The slide 120 engages the longitudinal slot 111. The slide 120 comprises a frictional braking mechanism 121 comprising a lever 122 and a compression spring 123, the lever 122 comprising a foot 124. The compression spring 123 causes the foot 124 to tribologically engage the tubular channel 110, fixing the slide 120 to a position along the tubular channel 110. The position of the slide 120 is adjusted to maintain a balanced condition of the suspended hanger 100 when asymmetrically loaded. The balanced condition of the suspended hanger 100 is defined as a horizontal orientation of the tubular channel 110 with respect to ground such that the tubular channel 110 is level. The suspended hanger 100 is suspended via the slide 120 and the position of the slide 120 along the longitudinal slot 111 affects the orientation of the suspended hanger 100. When the orientation of the suspended hanger 100 comprises a horizontal orientation of the tubular channel 110 with respect to ground such that the tubular channel 110 is level, the suspended hanger 100 is oriented in the balanced condition.

Figure 2A:
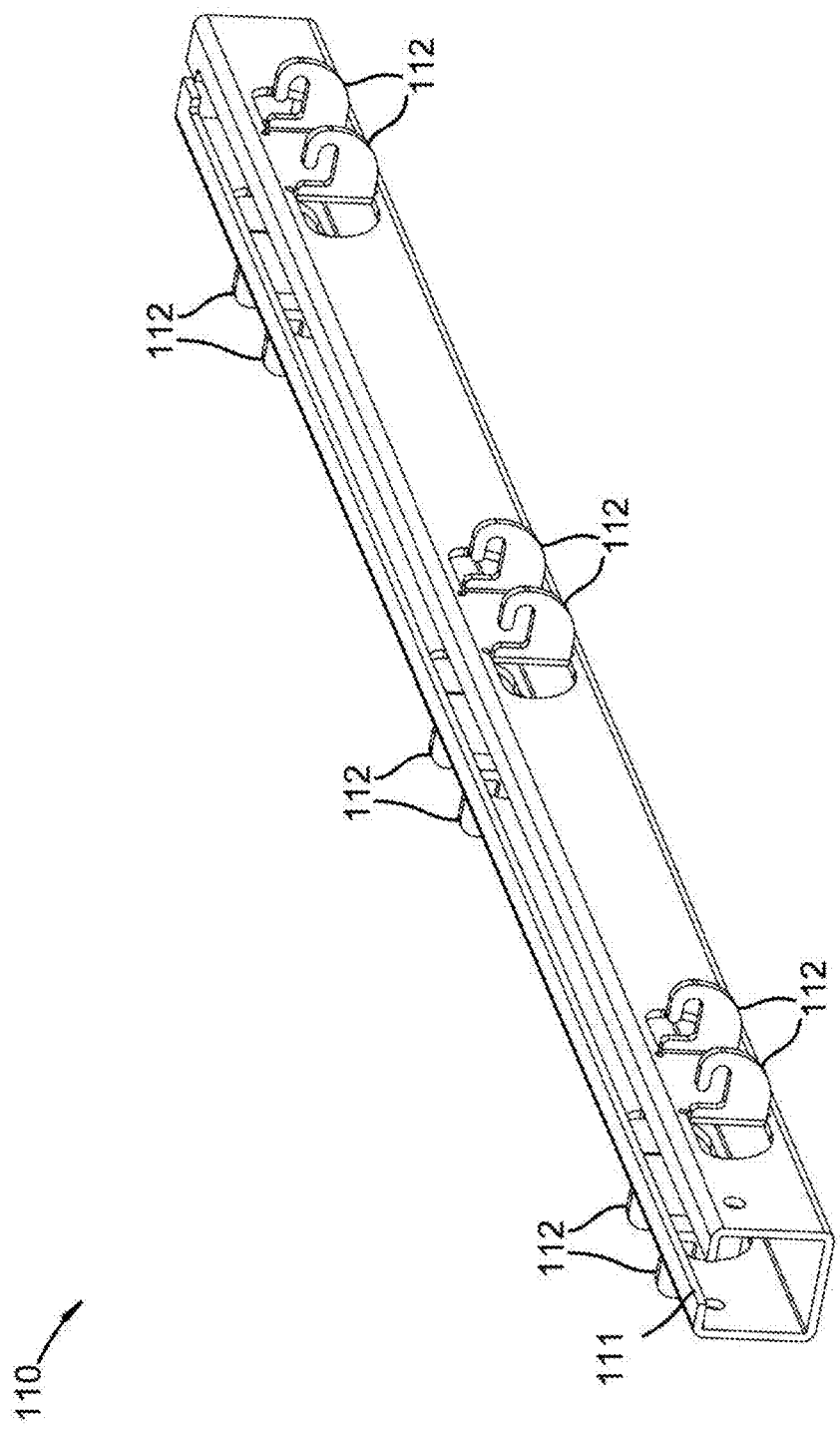
FIG. 2A-FIG. 2C depict embodiments of a tubular channel.
Figure 2B:
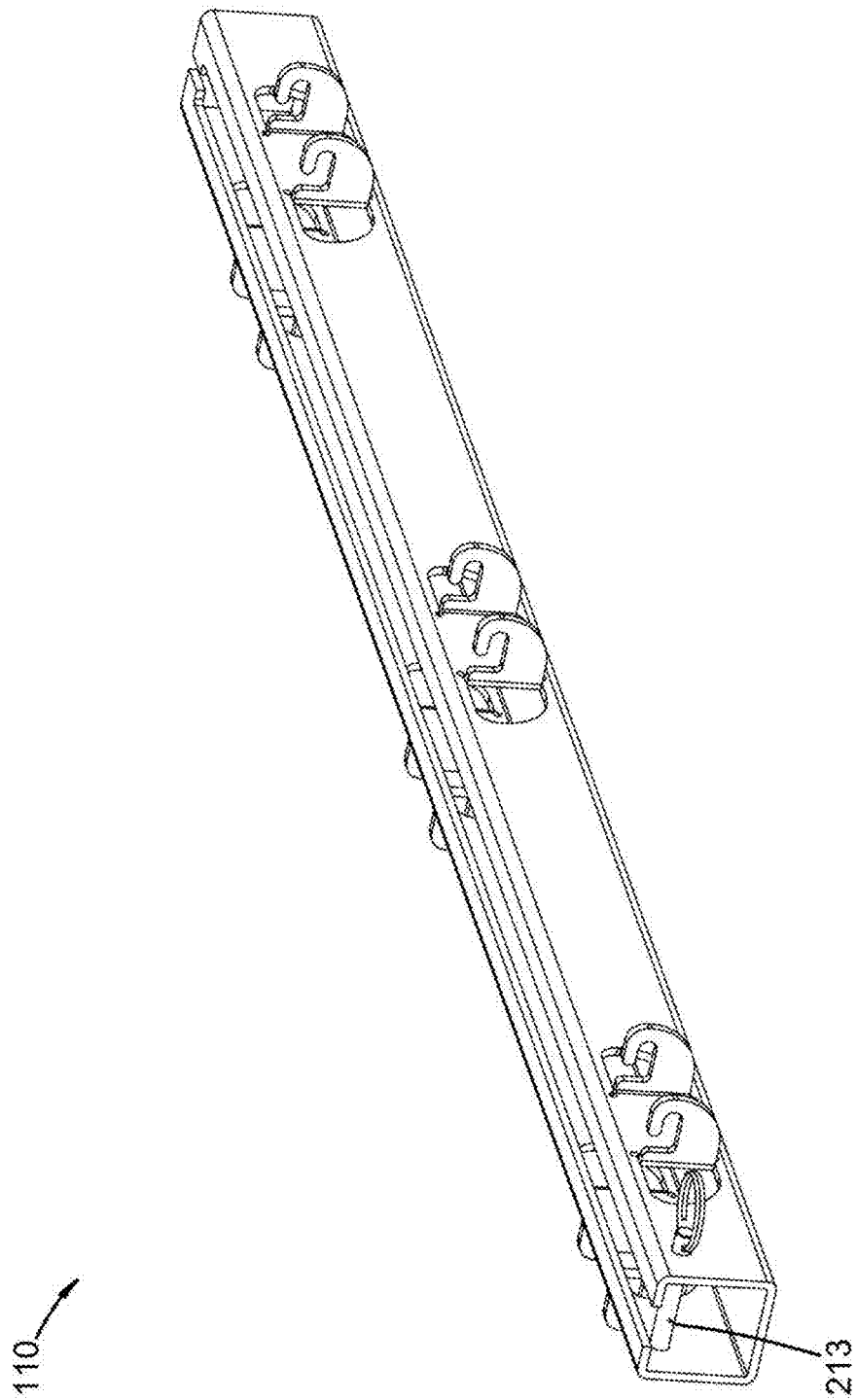
Figure 2C:
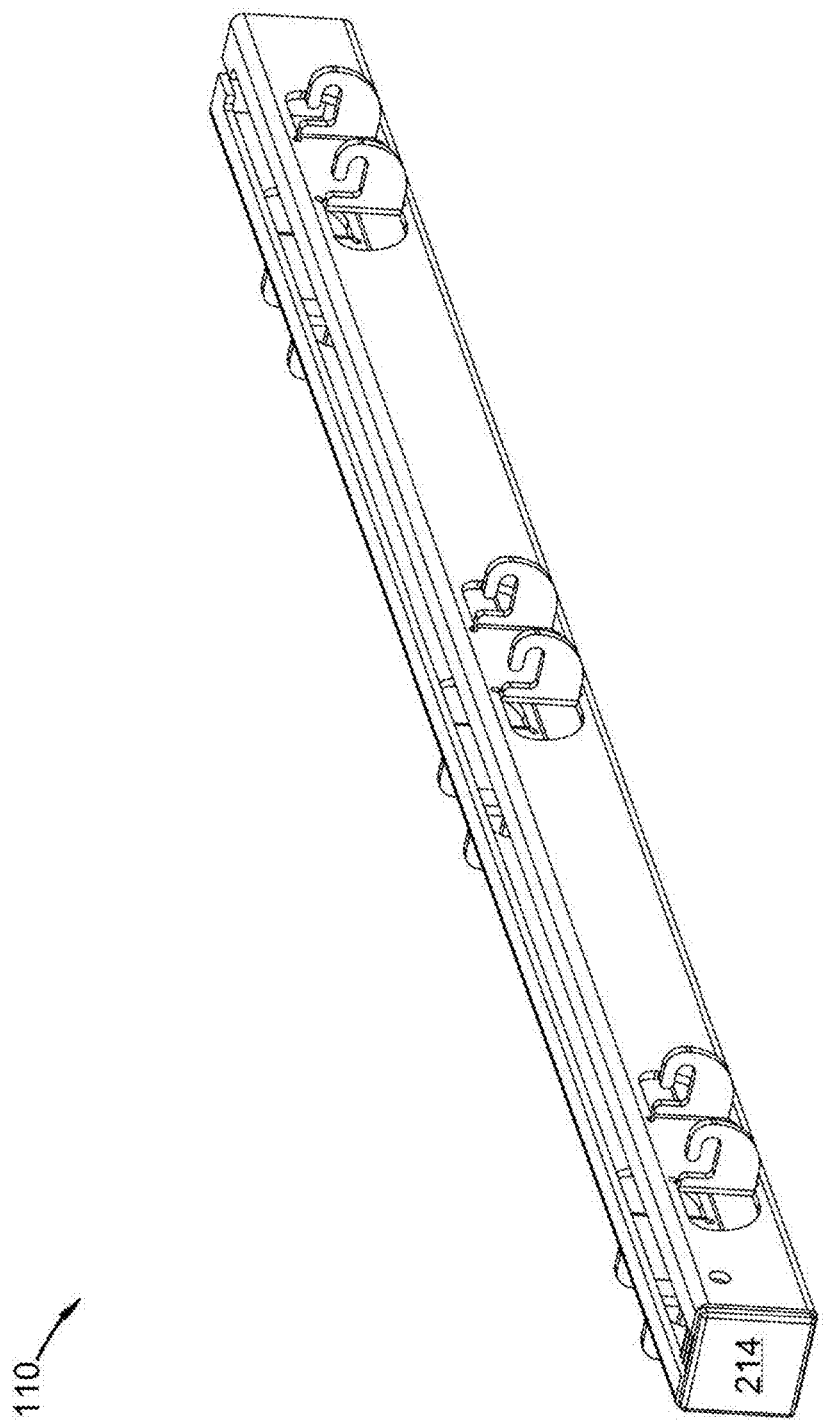

FIG. 2A-FIG. 2C depict embodiments of a tubular channel 110. In FIG. 2A, the tubular channel 110 comprises a longitudinal slot 111 and one or more means 112 for removably attaching one or more suspended objects 140 to the tubular channel 110. In one embodiment, the one or more means 112 for removably attaching one or more suspended objects 140 to the tubular channel 110 comprise hooks. In other embodiments, the one or more means 112 for removably attaching one or more suspended objects 140 to the tubular channel 110 are selected from the group consisting of hooks, rings, Velcro, snaps, clips, pins, adhesive, bolts, loops, rope, cable, rivets, tape, straps, slots, anchors, and magnets. One embodiment comprises three means 112 for removably attaching one or more suspended objects 140 to the tubular channel 110. Other embodiments comprise two means 112 or more than three means 112.

The suspended objects 140 are removably attached the tubular channel 110, typically for storage, and are able to be retrieved at a later time. In one embodiment, the suspended hanger 100 is raised and lowered by a user. A user raises the suspended hanger 100 with the suspended objects 140 in order to store the suspended objects 140 in a convenient location where the suspended objects 140 will not interfere with other activities. Raising the suspended hanger 100 stores the suspended objects 140 near a ceiling of a room allowing a user to walk and conduct other activities beneath the suspended objects 140. This method of storage utilizes space adjacent to a ceiling of a room. When a user wishes to retrieve one of the suspended objects 140, the suspended hanger 100 is lowered from a storage location, for example, adjacent a ceiling, and the suspended objects 140 are transported to a convenient height for user access.

In one embodiment, the tubular channel 110 comprises rectangular metal tubing. The tubular channel 110 is designed to support loads applied by the suspended objects 140. The rectangular metal tubing provides structure to the tubular channel 110 without being of a cumbersome weight. In one embodiment, the longitudinal slot 111 extends from a first end of the tubular channel 110 to a second end of the tubular channel 110 opposite the first end. A slide 120 is restricted to movement along the longitudinal slot 111. Extending the longitudinal slot 111 from the first end of the tubular channel 110 to the second end opposite the first end allows the slide 120 to be positioned at any point along the tubular channel 110. This allows for more possible configurations to accommodate various loading situations.

FIG. 2B depicts one embodiment of a tubular channel 110, wherein the tubular channel 110 further comprises one or more end stops 213. The end stops 213 prevent a slide 120 from disengaging the longitudinal slot 111. Without end stops 213, the slide 120 is capable of sliding out an end of the tubular channel 110 and become disengaged with the longitudinal slot 111. End stops 213 provide barriers that confine movement of the slide 120 in relation to the tubular channel 110 to movement along the longitudinal slot 111 and ensure that the slide 120 maintains engagement with the longitudinal slot 111. In one embodiment, the one or more end stops 213 comprise one or more pins. The one or more pins engage the tubular channel 110 and extend across one end of the tubular channel 110 to act as a barrier to keep the slide 120 from exiting the longitudinal slot 111.

FIG. 2C depicts one embodiment of a tubular channel 110, wherein the tubular channel 110 further comprises one or more end caps 214. The one or more end caps 214 are inserted into the tubular channel 110 to cover otherwise exposed edges of the tubular channel 110. In one embodiment, the one or more end caps 214 comprise plastic. In another embodiment, the one or more end caps 214 comprise rubber. In one embodiment, the tubular channel 110 is hollow and comprises an open end comprising a rectangular shape and the one or more end caps 214 comprise a similar shape to that of the tubular channel 110 and fit into the open end of the tubular channel 110.

Figure 3A:
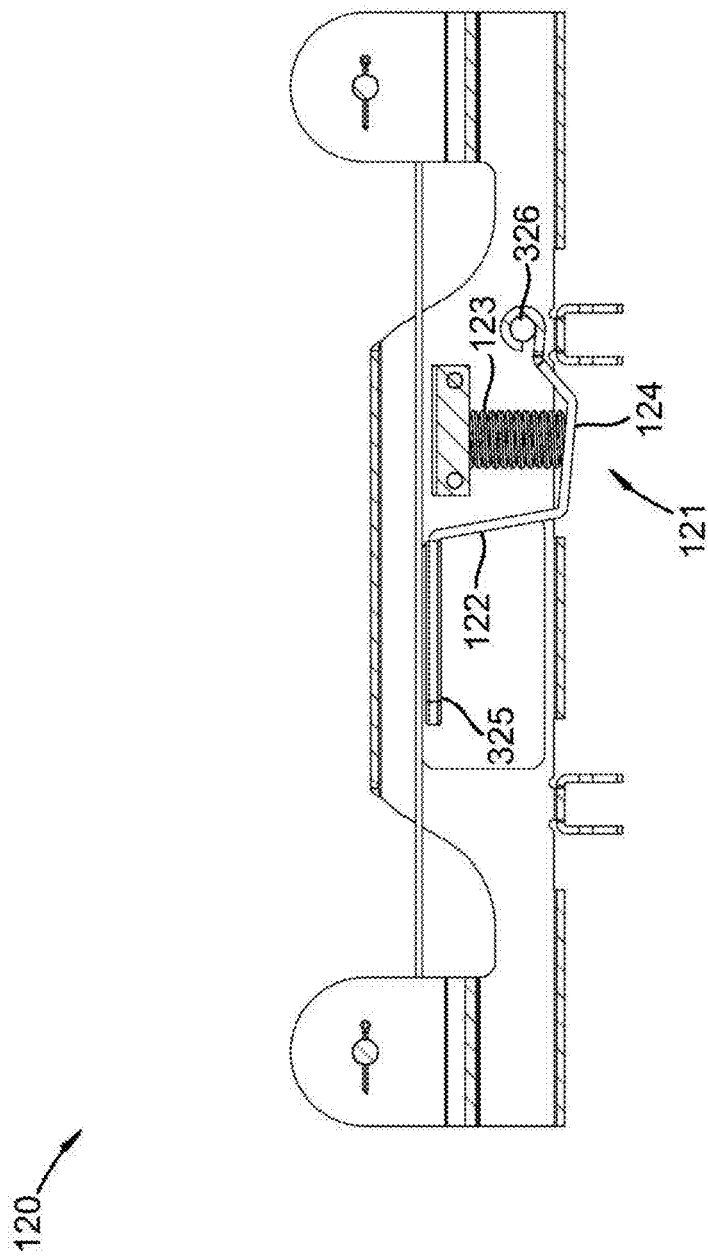
FIG. 3A-FIG. 3B depict section views of embodiments of a slide comprising a frictional braking mechanism.
Figure 3B:
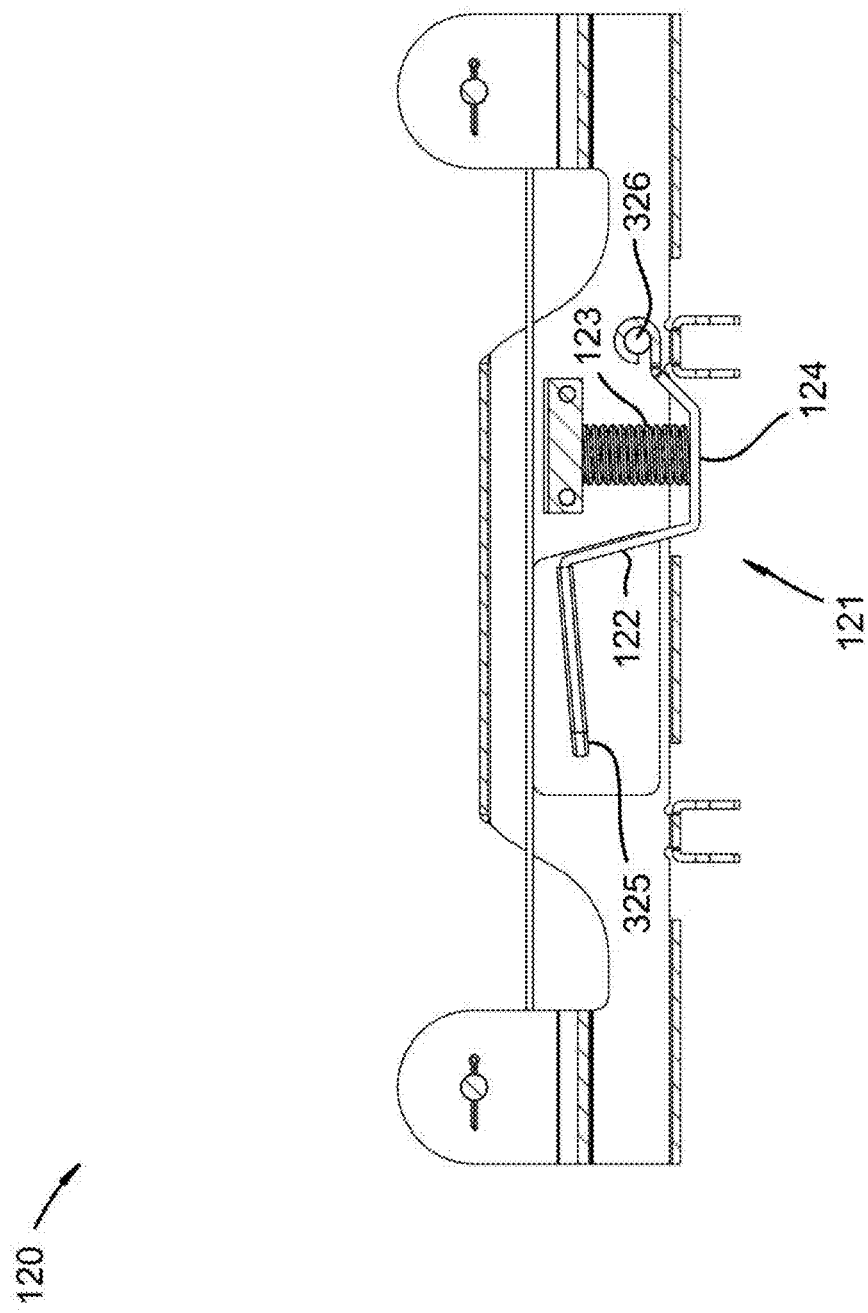

FIG. 3A-FIG. 3B depict section views of embodiments of a slide 120 comprising a frictional braking mechanism 121. The frictional braking mechanism 121 comprises a lever 122 and a compression spring 123 and the lever 122 comprises a foot 124. The compression spring 123 causes the foot 124 to tribologically engage the tubular channel 110, fixing the slide 120 to a position along the tubular channel 110. In one embodiment, the slide 120 further comprises a hinge 326 and the lever 122 rotates about the hinge 326. In one embodiment, the lever 122 further comprises a handle 325. The handle 325 is actuated to disengage the foot 124 from the tubular channel 110.

In FIG. 3A, the handle 325 is actuated and the foot 124 is disengaged from the tubular channel 110. When the foot 124 is disengaged from the tubular channel 110, the slide 120 is free to move along the tubular channel 110 to a desired position. When the slide 120 arrives at the desired position, the handle 325 is released and the foot 124 tribologically reengages the tubular channel 110, fixing the slide 120 to that position. The slide 120's position is fixed due to a frictional force between the tubular channel 110 and the foot 124 and one or more tabs 427. When the handle 325 is no longer actuated, the compression spring 123 exerts a force on the foot 124, pushing it against the tubular channel 110. The force between the foot 124 and the tubular channel 110 forces the slide 120 away from the tubular channel 110 until the tabs 427 engage an interior surface of the tubular channel 110 adjacent the longitudinal slot 111. Then, the compression spring 123 maintains a force between the tubular channel 110 and the foot 124 and one or more tabs 427. This force resists motion of the slide 120 in relation to the suspended hanger 100.

In FIG. 3B, the handle 325 is not actuated and the compression spring 123 causes the foot 124 to tribologically engage the tubular channel 110. The lever 122 rotates about the hinge 326 until the foot 124 engages the tubular channel 110. In one embodiment, the handle 325 is manually actuatable by a user. The lever 122 provides the user with sufficient mechanical advantage to compress the spring 123 to disengage the foot 124 from the tubular channel 110. The user then moves the slide 120 to a desired position along the tubular channel 110 and releases the lever 122 to secure the slide 120 to the tubular channel 110 at the desired position.

Figure 4:
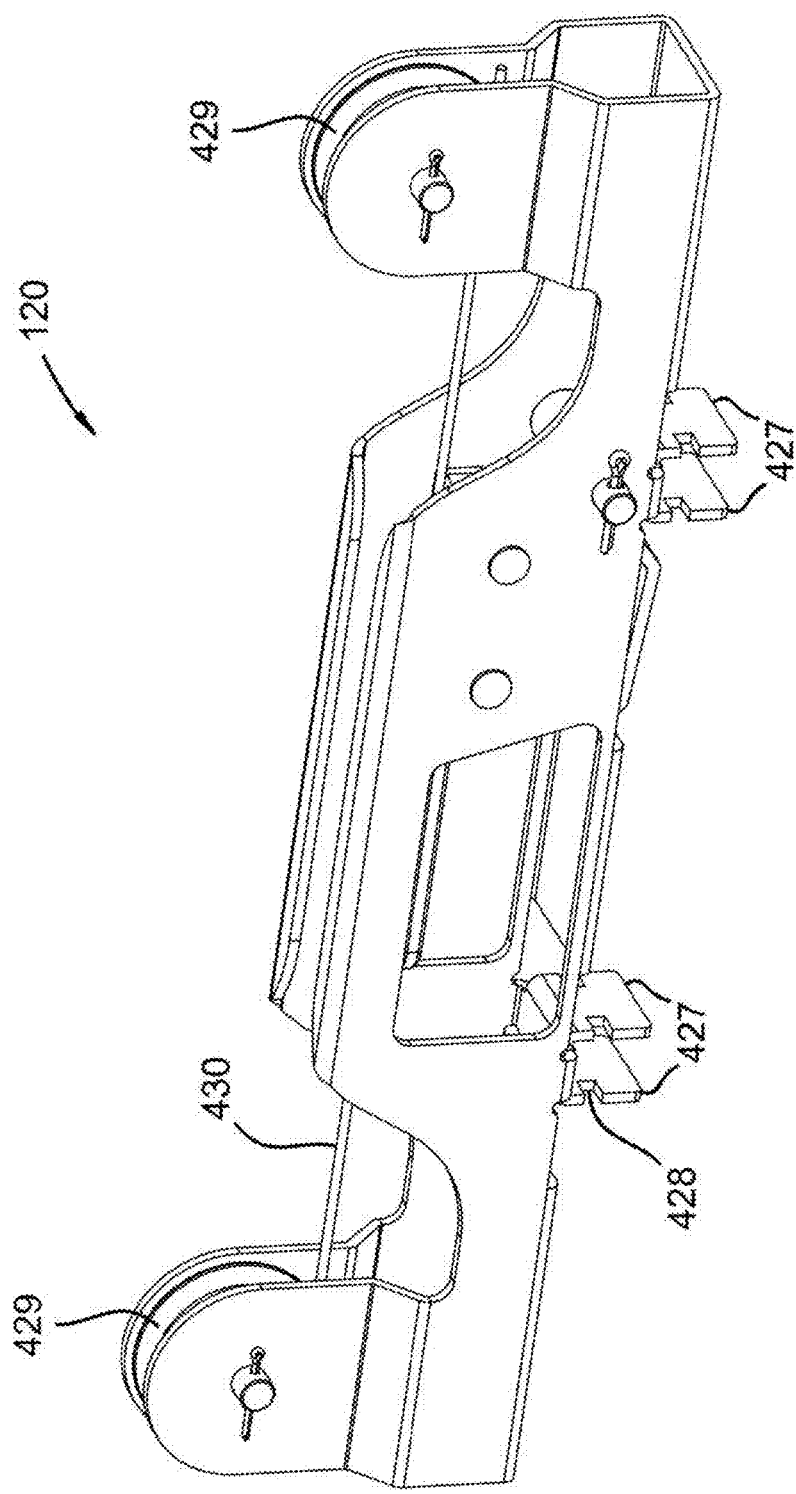
FIG. 4 depicts one embodiment of a slide comprising one or more tabs.

FIG. 4 depicts one embodiment of a slide 120 comprising one or more tabs 427. In one embodiment, the slide 120 engages the longitudinal slot 111 by means of one or more tabs 427 inserted into the longitudinal slot 111. In one embodiment, the tabs are T-shaped. In one embodiment, the one or more tabs 427 comprise grooves 428 corresponding to the longitudinal slot 111. The grooves 428 in the one or more tabs 427 engage the tubular channel 110 via the longitudinal slot 111.

In one embodiment, the slide 120 comprises one or more pulleys 429 by which the suspended hanger 100 is suspended. A cable 430 engages the one or more pulleys 429 and is connected to a structure at a height above the suspended hanger 100. The suspended hanger 100 is raised or lowered via the cable 430 that engages the one or more pulleys 429. The cable 430 comprises a first end fixed to the structure and a second end wound around a hoist. The hoist raises the suspended hanger 100 by reeling in cable 430 and lowers the suspended hanger 100 by letting out cable 430. The pulleys 429 help to keep the suspended hanger 100 balanced by keeping the slide 120 centered between the first end of the cable 430 and the hoist.

In another embodiment, the slide 120 comprises an eyebolt by which the suspended hanger 100 is suspended. A first end of a rope or cable attaches to the eyebolt and a second end of the rope or cable is wound around a hoist to raise or lower the suspended hanger 100. In still other embodiments, the suspended hanger 100 can be suspended by other means commonly known in the art.

Figure 5:
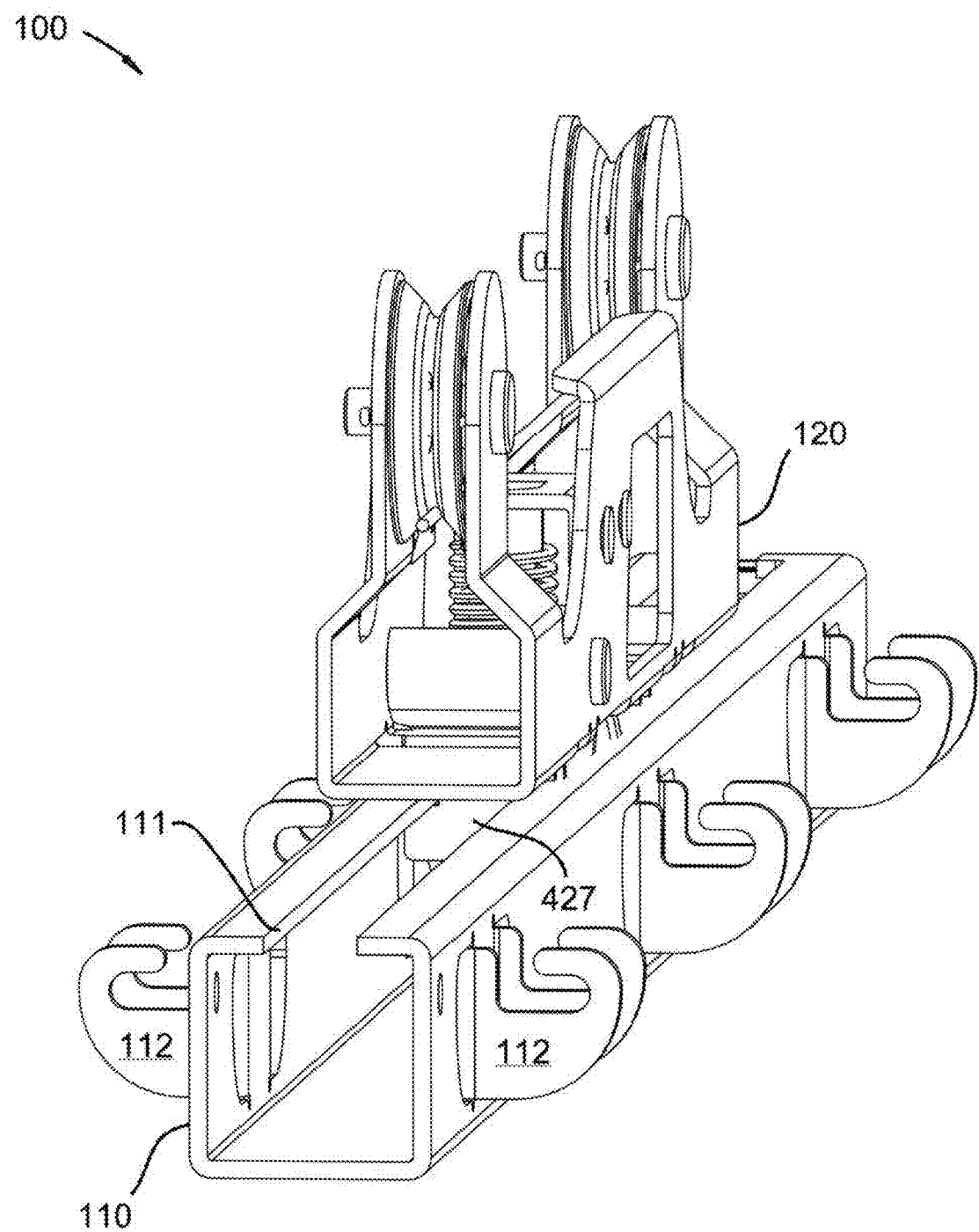
FIG. 5 depicts one embodiment of a slide engaging a tubular channel.

FIG. 5 depicts a side view of one embodiment of a slide 120 engaging a tubular channel 110. The tubular channel 110 comprises a longitudinal slot 111 and the slide 120 engages the longitudinal slot 111. In one embodiment, the slide 120 engages the longitudinal slot 111 by means of one or more tabs 427 inserted into the longitudinal slot 111. The slide 120 is repositionable along the longitudinal slot 111 and is adjusted as loading conditions of the suspended hanger 100 change. The tubular channel 110 comprises one or more means 112 for removably attaching one or more suspended objects 140 to the tubular channel 110. Suspended objects 140 are removably attached to the tubular channel 110 at various locations and the suspended objects 140 comprise various shapes and weights. Variable shapes, weights, and locations of the suspended objects 140 create a variety of loading conditions for the suspended hanger 100. The suspended hanger 100 is suspended by means of the slide 120, and the position of the slide 120 in relation to the tubular channel 110 as well as the loading conditions of the suspended hanger 100 created by the suspended objects 140 affect the orientation of the suspended hanger 100. The position of the slide 120 is adjusted according to the loading conditions of the suspended hanger 100 to maintain a balanced condition of the suspended hanger 100 when asymmetrically loaded.

Figure 6B:
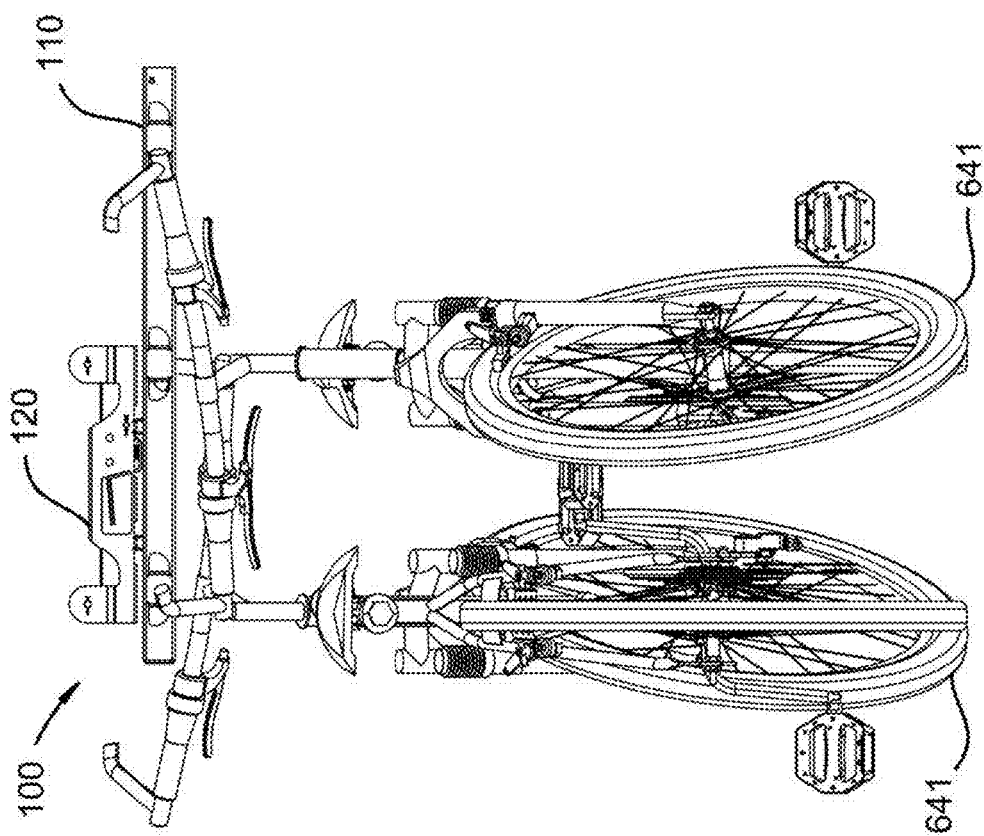

FIG. 6A-FIG. 6B depict embodiments of a suspended hanger 100 supporting bicycles 641. The suspended hanger 100 comprises a tubular channel 110 and a slide 120. The tubular channel 110 comprises a longitudinal slot 111 and one or more means 112 for removably attaching one or more suspended objects 140 to the tubular channel 110. In one embodiment, the longitudinal slot 111 comprises smooth edges allowing the slide 120 to be moved along the longitudinal slot 111 in increments of various sizes, thus allowing the slide 120 to be adjusted to any number of positions along the tubular channel 110. In another embodiment, the longitudinal slot 111 comprises notches at predetermined positions and the slide 120 is adjustable between a finite number of predetermined positions along the tubular channel 110. Adjusting between a finite number of predetermined positions is applicable when a user is frequently loading the suspended hanger 100 between two or more loading conditions.

For example, in one embodiment, a suspended hanger 100 comprises three means 112 for removably attaching one or more suspended objects 140 to the tubular channel 110 and the three means 112 for removably attaching one or more suspended objects 140 to the tubular channel 110 are designed to hold three bicycles 641. A user loads the suspended hanger 100 with three bicycles 641. The slide 120 is adjusted to a first predetermined position along the tubular channel 110 corresponding to a loading condition of three bicycles 641 as depicted in FIG. 6A. Frequently, the user removes one of the three bicycles 641 from the suspended hanger 100. In order to maintain a balanced condition of the suspended hanger 100, the slide 120 is adjusted to a second predetermined position along the tubular channel 110 corresponding to a loading condition of two bicycles 641, as depicted in FIG. 6B. The user returns the bicycle to the suspended hanger 100 and the slide 120 is adjusted back to the first predetermined position along the tubular channel 110 corresponding to the loading condition of three bicycles 641. Frequent changes between the first predetermined position and the second predetermined position justify a longitudinal slot 111 comprising notches at predetermined positions as discussed previously.

Figure 7:
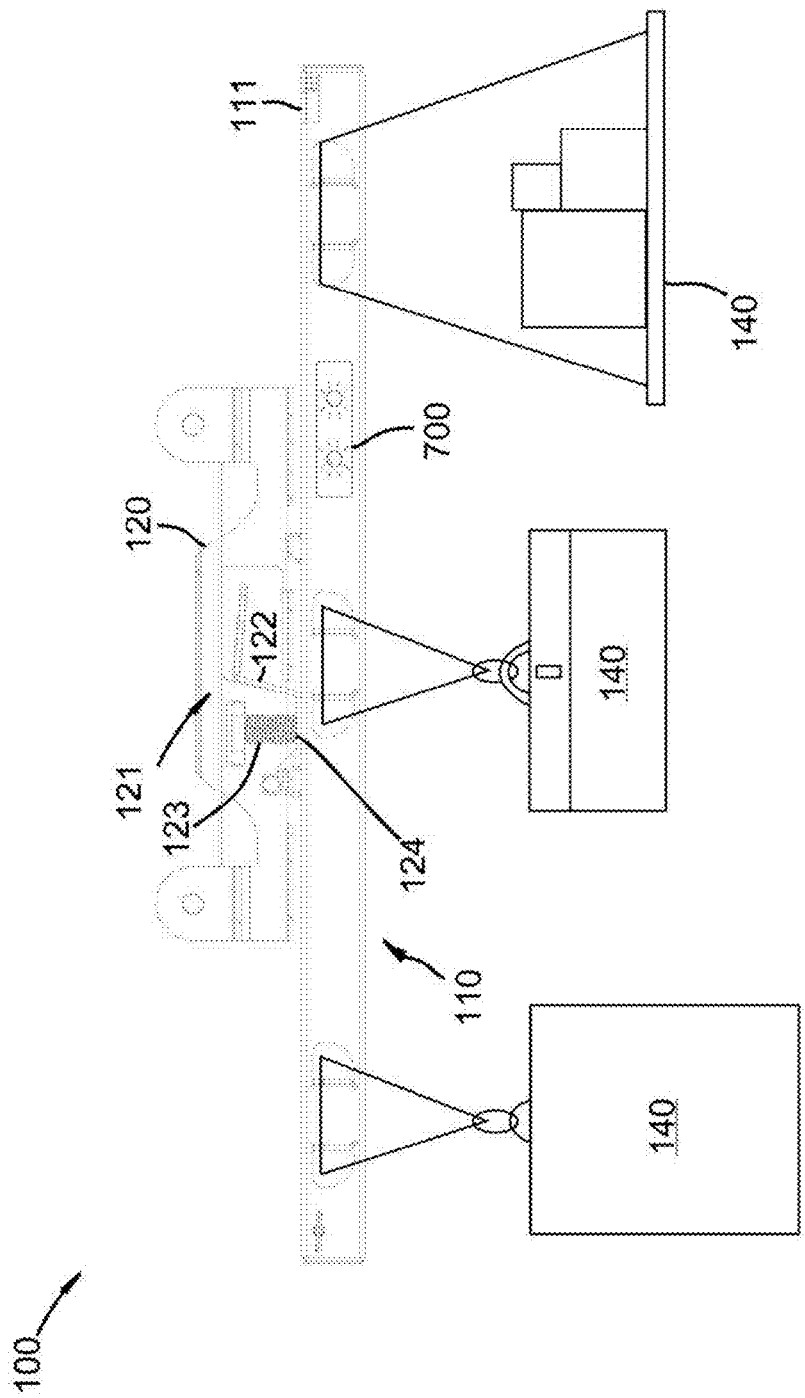
FIG. 7 depicts one embodiment of a suspended hanger comprising an indicator that indicates to a user whether or not the suspended hanger is oriented in the balanced condition.

In one embodiment, the suspended hanger 100 further comprises an indicator 700 that indicates to a user whether or not the suspended hanger 100 is oriented in the balanced condition. FIG. 7 depicts this embodiment. For example, in one embodiment, the suspended hanger 100 comprises a spirit level or a laser guided level. The spirit level and or laser guided level assesses the orientation of the suspended hanger 100 and indicates to a user whether or not the suspended hanger 100 is oriented in the balanced condition. A user adjusts the position of the slide 120 in relation to the tubular channel 110 until the spirit level and or laser guided level indicates the suspended hanger 100 is in the balanced condition.

In another embodiment, the suspended hanger 100 comprises an electronic sensor and a display. The electronic sensor may comprise a laser guided level. The electronic sensor assesses the orientation of the suspended hanger 100 and the display indicates to a user whether or not the suspended hanger 100 is oriented in the balanced condition. The display will activate a green light if the suspended hanger 100 is oriented in the balanced condition and a red light if the suspended hanger 100 is not oriented in the balanced condition. In one embodiment, the display will instruct a user which direction to move the slide 120 in order to orient the suspended hanger 100 in the balanced condition.

In one embodiment, the suspended hanger 100 further comprises an alarm that alerts a user when the suspended hanger 100 is not oriented in the balanced condition. In one embodiment, the alarm is an audible alarm that sounds when the suspended hanger 100 is not oriented in the balanced condition. The alarm aids a user in safely raising or lowering the suspended hanger 100. For example, in one embodiment, a user is raising a suspended hanger 100 with suspended objects 140 removably attached to the suspended hanger 100. As the suspended hanger 100 raises, one of the suspended objects 140 shifts causing the suspended hanger 100 to lose the balanced condition. The alarm alerts the user that the suspended hanger 100 is not oriented in the balanced condition allowing the user to make adjustments before continuing to raise the suspended hanger 100. In one embodiment, the alarm is coupled to a control device that raises and lowers the suspended hanger 100 and when the suspended hanger 100 is not oriented in the balanced condition, the alarm alerts a user and disables the control device so that the suspended hanger 100 cannot be raised or lowered while the suspended hanger 100 is not oriented in the balanced condition.

The invention claimed is:

1. A suspended hanger, comprising:

A tubular channel comprising two opposed spaced apart side walls joining a top side and bottom side, a central portion of the top side comprising a longitudinal slot and the side walls comprising one or more hooks extending normally outward from the side walls for removably attaching one or more suspended objects to the tubular channel; and a generally U-shaped slide assembly comprising spaced apart opposed side walls attached along an upper portion of the side walls of the slide assembly are end pulleys between the side walls of the slide assembly and engaging a cable, the cable having one end affixed to an overhead structure and the other end attached to an overhead hoist, thereby movably suspending the slide assembly below the overhead structure and the hoist, as the hoist reels the cable in and out, and a bottom side of the slide assembly comprising two or more tabs comprising slots disposed between the side walls of the slide assembly oriented perpendicular to the side walls of the slide assembly, wherein the tab slots are below the bottom side of the generally U-shaped slide assembly, and wherein the longitudinal slot of the tubular channel is inserted through the tab slots thereby linearly movably hanging the tubular channel from the generally U-shaped slide assembly;

the slide assembly further comprising a frictional braking mechanism comprising a lever and a compression spring, the lever comprising a foot, wherein the compression spring causes the foot to tribologically engage the top side of the tubular channel adjacent the longitudinal slot, fixing the generally U-shaped slide assembly to a position along the longitudinal slot of the tubular channel, and wherein the position of the tubular channel is adjusted along the longitudinal slot to maintain a balanced condition of the generally U-shaped slide assembly and the tubular channel on the cable when the hooks are asymmetrically loaded.

2. The suspended hanger of claim 1, wherein the generally U-shaped slide assembly engages the longitudinal slot by means of the tabs which are U-shaped tabs inserted into the longitudinal slot.

3. The suspended hanger of claim 1, wherein the hooks comprise a reentrant upper portion.

4. The suspended hanger of claim 1, wherein the tubular channel comprises rectangular metal tubing, and wherein the longitudinal slot extends from a first end of the tubular channel to a second end of the tubular channel opposite the first end.

5. The suspended hanger of claim 1, wherein the generally U-shaped slide assembly comprises the end pulleys by which the generally U-shaped slide assembly is suspended.

6. The suspended hanger of claim 1, wherein the tubular channel further comprises one or more end stops that prevent the slide assembly from disengaging the longitudinal slot.

7. The suspended hanger of claim 6, wherein the one or more end stops comprise pins.

8. The suspended hanger of claim 1, wherein the tubular channel further comprises one or more end caps.

9. The suspended hanger of claim 1, wherein the generally U-shaped slide assembly further comprises a hinge and wherein the lever rotates about the hinge pin.

10. The suspended hanger of claim 1, wherein the lever further comprises a handle, and wherein the handle is actuated to disengage the foot from the top side of the tubular channel.

11. The suspended hanger of claim 10, wherein the handle is manually actuatable by a user.

12. The suspended hanger of claim 1, comprising three pairs of hooks for removably attaching one or more suspended objects to the tubular channel.

13. The suspended hanger of claim 12, wherein the three pairs of hooks for removably attaching one or more suspended objects to the tubular channel hold three bicycles.

14. The suspended hanger of claim 1, wherein the generally U-shaped slide is incrementally adjustable along the longitudinal slot of the tubular channel.

15. The suspended hanger of claim 1, wherein the generally U-shaped slide assembly is adjustable between predetermined incremental positions along the tubular channel.

16. The suspended hanger of claim 1, wherein the suspended hanger further comprises an indicator comprising a bubble that indicates to a user whether or not the suspended hanger is oriented in the balanced condition.

17. The suspended hanger of claim 1, wherein the suspended hanger further comprises an alarm that alerts a user when the suspended hanger is not oriented in the balanced condition.

18. The suspended hanger of claim 1, further comprising a laser guided level indicator.

* * * * *